United States Patent [19]
Hughes et al.

[11] Patent Number: 6,114,625
[45] Date of Patent: *Sep. 5, 2000

[54] ARTICLE COMPRISING A FASTENER

[75] Inventors: Michael Joseph Hughes, Neshanic; Pratod Vishweshwar Kasbekar, Manalapan; Ningsheng Zhu, Whippany, all of N.J.

[73] Assignee: Lucent Technologies Inc., Murray Hill, N.J.

[ * ] Notice: This patent issued on a continued prosecution application filed under 37 CFR 1.53(d), and is subject to the twenty year patent term provisions of 35 U.S.C. 154(a)(2).

[21] Appl. No.: 09/047,590

[22] Filed: Mar. 25, 1998

[51] Int. Cl.⁷ ....................................................... H02G 3/08
[52] U.S. Cl. ......................... 174/52.1; 174/50; 361/747; 361/759; 220/4.02; 220/4.07; 429/97; 429/98; 429/99; 429/100
[58] Field of Search ..................... 174/52.1, 50; 361/747, 361/759; 220/4.02, 4.07; 429/97–100

[56] References Cited

U.S. PATENT DOCUMENTS

| | | | |
|---|---|---|---|
| 4,904,549 | 2/1990 | Goodwin et al. | 429/97 |
| 5,697,071 | 12/1997 | Fan | 455/90 |
| 5,718,985 | 2/1998 | Bunyea et al. | 429/97 |
| 5,856,038 | 1/1999 | Mason | 429/97 |
| 5,857,148 | 1/1999 | Weisshappel et al. | 455/90 |

Primary Examiner—William A. Cuchlinski, Jr.
Assistant Examiner—Ronnie Mancho
Attorney, Agent, or Firm—Law Offices of Peter H. Priest

[57] ABSTRACT

A fastener for detachably coupling a housing, such as a battery pack, to an appliance, such as a wireless terminal, is disclosed. In use, the fastener is disposed in a housing. When a user applies a force to the fastener to release the housing from the appliance, the fastener rotates about an axis, causing an engagement feature of the fastener to rotate away from the appliance, thereby decoupling the fastener from the appliance. The fastener includes a biasing member which provides a restoring force that keeps the fastener coupled to the appliance in the absence of a decoupling force. In some embodiments, the fastener includes various features suitable for reducing stress that accumulates in the biasing member as it rotates during decoupling. Such features include a stress-reducing surface, and an offset between the stress-reducing surface and the axis of rotation.

26 Claims, 7 Drawing Sheets

ARTICLE COMPRISING A FASTENER

FIELD OF THE INVENTION

The present invention relates generally to packaging. More particularly, the present invention relates to a fastener for detachably coupling a housing to an appliance, such as cordless or cellular phones or other hand held units including a battery or other removable module which is attached and detached.

BACKGROUND OF THE INVENTION

Small electrical appliances are often battery powered. As batteries in such appliances exhaust their charge, they are typically replaced or recharged. Illustrative battery-powered appliances include, for example, cordless or cellular telephones. The batteries in such telephones are typically contained in a battery pack. Though usually rechargeable, such batteries may lose their ability to hold a charge and therefore require replacement. To simplify battery replacement, the battery pack is typically detachably coupled to the telephone by a fastening mechanism. Several examples of prior art fasteners are described below in conjunction with FIGS. 1a and 1b.

FIG. 1a depicts a conventional movable tab 106 for coupling a battery pack to a portable appliance such as a telephone. Movable tab 106 is formed in side 102 of battery-pack cover 100. Fixed end 108 of movable tab 106 is disposed proximal to upper edge 104 of side 102. Catch 114 protrudes from outer surface 110 of movable tab 106 near free edge 112. Pushing on outer surface 110 of movable tab 106 releases catch 114 from a notch (not shown) in the body of the telephone. The battery pack (contained within cover 100, but not shown) is then slid or pulled from the telephone for removal. The battery pack may be reinstalled by pushing or sliding toward the notch in the phone body.

Movable tab 106 of the prior art has several drawbacks, as follows. To disengage battery-pack cover 100, a force is applied to outer surface 110 of movable tab 106 above catch 114 (i.e., between catch 114 and edge 104). The disengaging force is necessarily applied to first region 109 above catch 114, since second region 111 of movable tab 106 below catch 114 is inaccessible while the battery-pack cover is engaged to the telephone. First region 109 provides a relatively short lever arm; a relatively large disengaging force is therefore required to detach the battery pack. Moreover, movable tab 106 is prone to breakage, because, as the movable tab is deflected, stresses develop therein and concentrate near where the movable tab is fixed to the cover. Excessive deflection may cause permanent deformation or fracturing of movable tab 106. If the movable tab is made thicker to improve robustness, then, undesirably, a greater force must be applied to disengage the battery pack.

FIG. 1b depicts a conventional movable tab 206 for coupling a battery pack to an appliance, such as a telephone. Movable tab 206 has fixed end 208 that depends from side 202 of cover 200 proximal to lower edge 204. Catch 214 protrudes from outer surface 210 of movable tab 206 near free edge 212. Pushing on outer surface 210 of movable tab 206 above catch 214 releases the catch from a notch (not shown) in the body of the telephone (not shown). Several drawbacks are associated with movable tab 206. In particular, like tab 106, movable tab 206 is prone to failure due to stress concentration at fixed end 208. Furthermore, tab 206 is likely to fail if it is pulled away from cover 200. In addition, foreign objects can lodge in the region between movable tab 206 and cover 200 preventing release of the cover.

In a third prior art catch (not shown), the "fixed" end of the movable tab is hingeably attached to the bottom of the battery-pack cover. A spring is typically positioned between the movable tab and a brace member to provide a biasing force for disengagement/engagement operations. Using such a spring disadvantageously increases parts count, which typically results in an increase in device cost and complexity.

As such, a need exists for a robust, inexpensive and simple to manufacture fastener for detachably coupling a battery pack or other removable part i;o a small appliance. Moreover, such a fastener should be easy for a consumer to operate and result in an aesthetic package.

SUMMARY OF THE INVENTION

Some embodiments of the present invention provide an appliance having a detachable housing including a one-piece fastener. The fastener includes a biasing member that keeps the fastener and housing engaged to the appliance in a first position in the absence of a force that is applied to release the housing. The biasing member is advantageously configured as a cantilever. A free end of the cantilever abuts an internal surface of the housing. As a force is applied by a user to the fastener, the fastener rotates to a second position wherein the fastener disengages from the appliance. As the fastener rotates, the biasing member flexes, storing energy. As the applied force is removed, the biasing member releases stored energy and returns to the first position.

The fastener advantageously includes a variety of features for reducing stress in the biasing member as it is flexed during rotation. In some embodiments, the fastener comprises a stress-reducing surface that depends from the free end of the biasing member. The stress-reducing surface, which is advantageously curved, is in contact with the aforementioned internal surface of the housing. As the fastener rotates, the curvature of the stress-reducing surface decreases the flex imparted to the biasing member, relative to a flat surface, for a given amount of rotation.

Moreover, in some embodiments, the biasing member is advantageously offset from an axis of rotation of the fastener. The offset also reduces the flex in the biasing member for a given amount of rotation. Further features and advantages of the present invention will be apparent from the following detailed description of specific embodiments thereof when read in conjunction with the accompany drawings, which are described briefly below.

DETAILED DESCRIPTION

The present invention provides a housing or module that can be coupled to and decoupled from an appliance. Such a housing advantageously facilitates modular appliance design and manufacture. In particular, parts, circuitry, power supplies, and the like that are expected to require periodic servicing, replacement, etc., may be placed in such a housing and readily removed from the appliance, as necessary.

The housing incorporates a fastener by which the housing is detachably coupled to the appliance. The fastener is advantageously configured as a discrete, one-piece "mechanism" that is manufactured separately from the housing. In such embodiments, the housing is specifically adapted to receive the one-piece fastener. As configured in accordance with the present teachings, the fastener is less prone than some prior-art fasteners to mechanical failure due to stress concentrations.

Figure 1A:
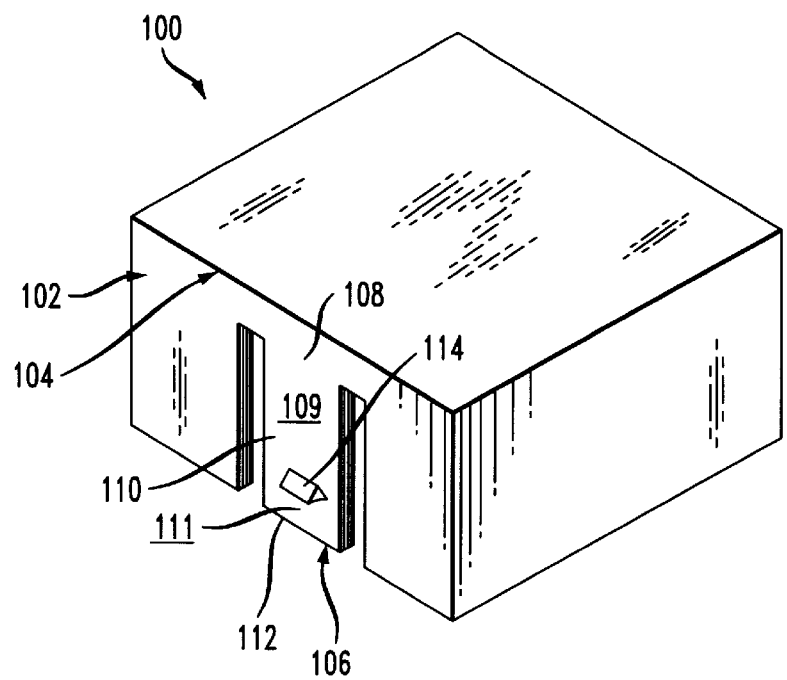
FIG. 1a depicts a first conventional fastener.
Figure 1B:
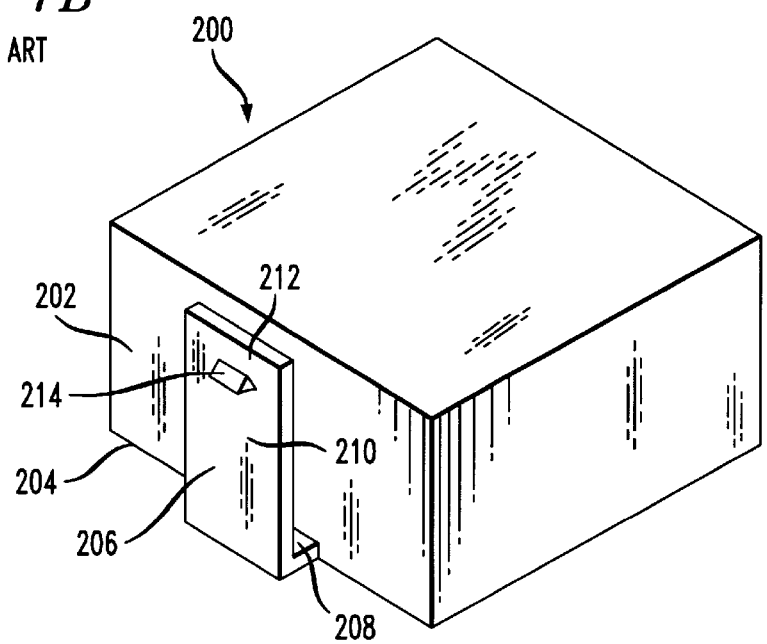
FIG. 1b depicts a second conventional fastener.
Figure 2:
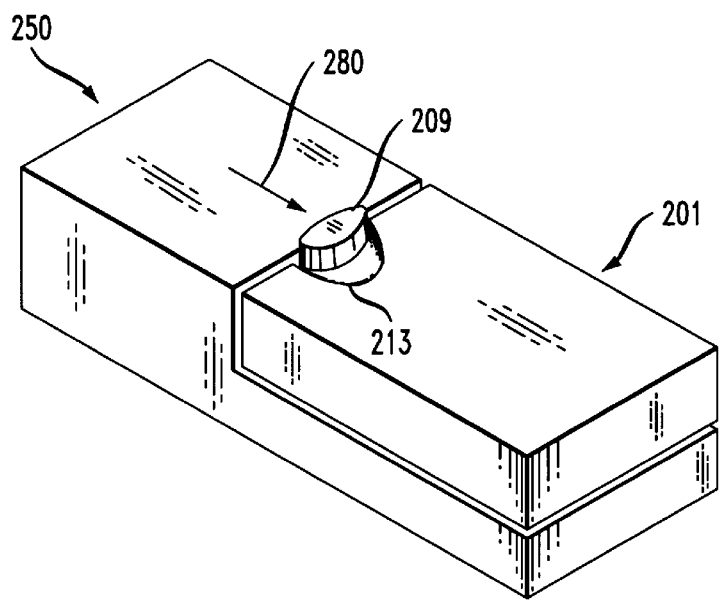
FIG. 2 depicts an illustrative wireless terminal in accordance with an illustrative embodiment of the present invention.

One use for the present housing/fastener is as a battery pack for a wireless terminal (e.g., cordless telephone, cellular telephone, wireless Personal Digital Assistant (PDA), wireless data modems, etc.). FIG. 2 depicts a perspective back-side view of wireless terminal 250 in accordance with an illustrative embodiment of the present invention. Wireless terminal 250 incorporates the present housing configured as a battery pack 201. Release 209, which depends from the present fastener and protrudes through opening 213 in battery pack 201, is moved in a direction indicated by direction vector 280 to disengage the battery pack from the wireless terminal.

In accordance with the present teachings, some embodiments of a fastener for use in wireless terminal 250 advantageously include: (i) a surface, edge, point, etc., about which the fastener rotates in operation; (ii) a knob, trigger or other protuberance which a user pushes, pulls, etc., to actuate the fastener to release the housing; (iii) an engaging arm or other instrumentality that provides a mechanical connection to a body portion of the wireless terminal; (iv) a biasing member that keeps the engaging arm mechanically connected to the body of the wireless terminal in the absence of an applied releasing force; and (v) at least one stress-reducing feature for moderating stress that concentrates in the biasing member as the fastener rotates in operation.

Figure 3:
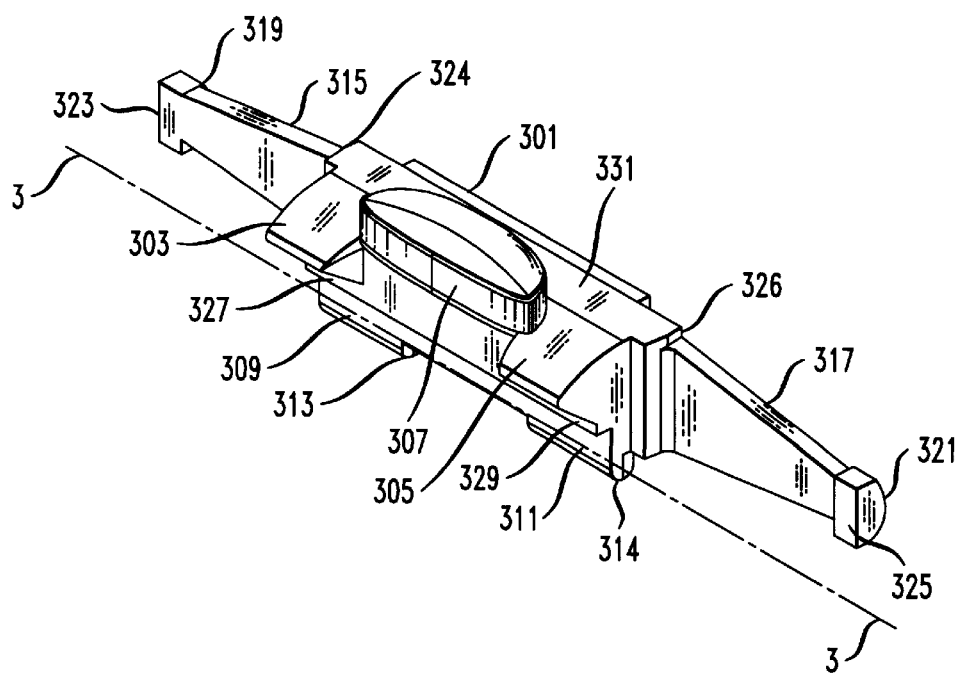
FIG. 3 depicts a perspective view of a fastener in accordance with an illustrative embodiment of the present invention.
Figure 4:
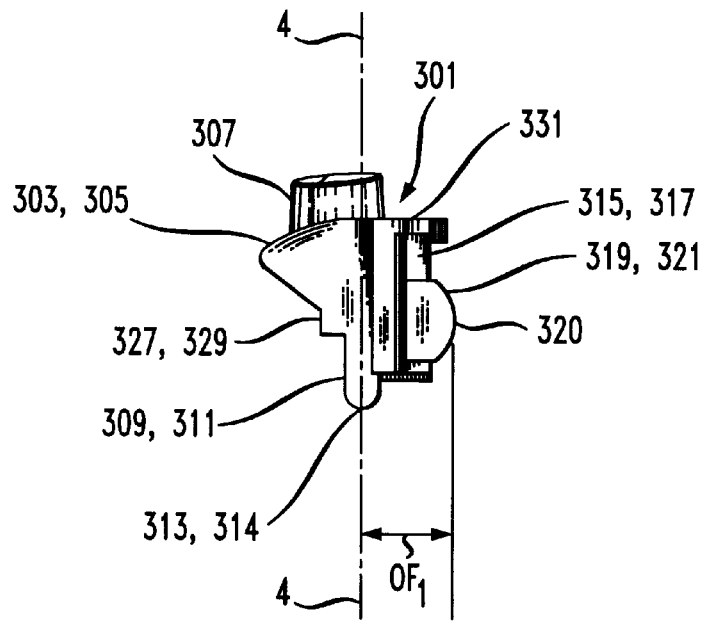
FIG. 4 depicts a side view of the fastener of FIG. 3.

FIGS. 3 & 4 depict perspective and side views of illustrative fastener 301 in accordance with the present teachings. In some embodiments, fastener 301 is used to detachably couple battery pack 201 to wireless terminal 250 of FIG. 2. In other embodiments, fastener 301 is used to detachably couple other housings containing other electrical elements (e.g., circuitry, etc.) to other appliances. For brevity, such other embodiments are not described herein. Those skilled in the art can readily apply the present teachings to provide housings containing items other than batteries to appliances other than wireless terminals.

Figure 5:
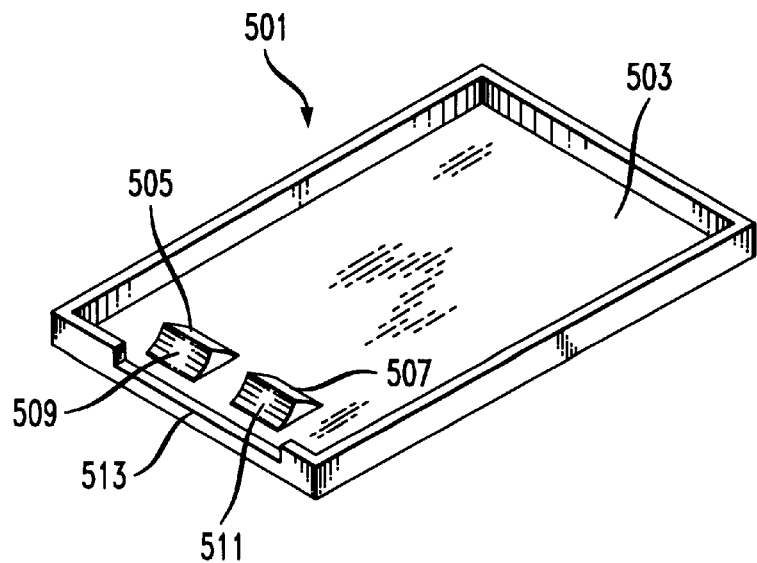
FIG. 5 depicts a base that receives the fastener of FIG. 3.
Figure 6:
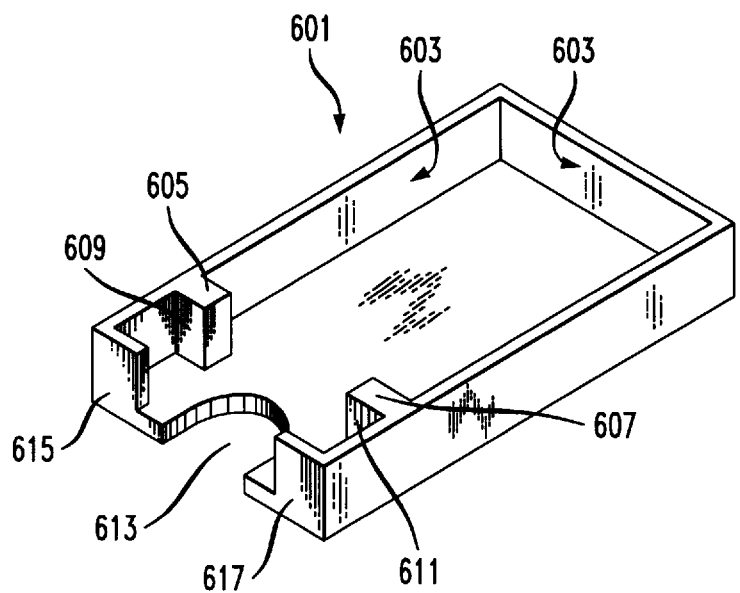
FIG. 6 depicts a cover that engages the base of FIG. 5 and that is configured to receive the fastener of FIG. 3.

As previously noted, fastener 301 is advantageously disposed within a housing (e.g., battery pack) when in use. FIGS. 5 & 6 depict respective base 501 and cover 601 portions of an illustrative, housing. Base 501 and cover 601 are shown mated to form housing 701 in FIG. 7.

Illustrative fastener 301 incorporates elements (i)–(v) listed above. As to element (i), fastener 301 advantageously includes semi-cylindrical protuberances 309 and 311 having respective curved surfaces 313 and 314. Base 501 (FIG. 5) receives fastener 301 such that curved surfaces 313 and 314 rest on inner surface 503 between wall 513 and wedge-shaped stops 505 and 507. A portion of curved surfaces 313 and 314 abut respective incurvate surfaces 509 and 511 of the stops. In operation, the fastener rotates about an axis 3—13 (FIG. 3) where the curved surfaces abut inner surface 503. The complementary shapes of the surfaces of semi-cylindrical protuberances 309, 311 and stops 505, 507 substantially reduce attrition that would otherwise occur to those features due to frictional forces generated during repeated rotation of the fastener.

Figure 7:
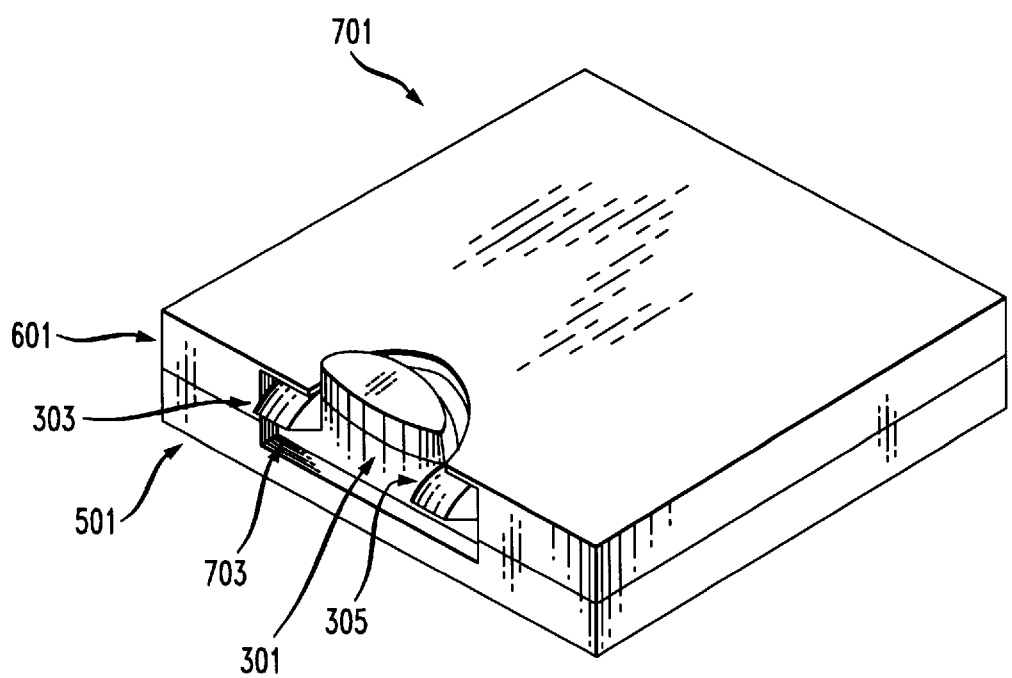
FIG. 7 depicts a housing comprising the base of FIG. 5 and the cover of FIG. 6, wherein the fastener of FIG. 3 is disposed therein.

Regarding element (ii), fastener 301 incorporates knob 307, sized for actuation by a user's finger. When fastener 301 is disposed within housing 701, knob 307 protrudes through oblong opening 613 in cover 601 such that the knob is accessible to a user (FIG. 7). Element (iii) is realized in illustrative fastener 301 by engagement members 303 and 305. When fastener 301 is disposed within housing 701, engagement members 303 and 305 protrude through opening 703 in housing 701 defined by wall 513 of base 501 and walls 615 and 617 of cover 601. Engagement members 303 and 305 engage suitably-configured aperture(s) (not shown) in a body portion of an appliance, such as body portion 250 in FIG.2, to which housing 701 is mated.

Fastener 301 further includes two biasing members 315 and 317 (element (iv)). In illustrative fastener 301, the biasing members are advantageously configured as cantilevers, each having a fixed end 324, 326 and a free end 323, 325. Biasing members 315 and 317 advantageously incorporate stress-reducing features (element (v)), such as, for example, respective stress-reducing-surfaces 319 and 321 depending from respective free ends 323 and 325 of the biasing members. Other stress-reducing features are described later in this specification.

Biasing members 315 and 317 abut ribs 605 and 607 disposed on inside surface 603 of cover 601 (FIG. 6). More particularly, stress-reducing surfaces 319 and 321 abut respective surfaces 609 and 611 of respective ribs 605 and 607. The relative positions of ribs 605 and 607, stress-reducing surfaces 319 and 321, semi-cylindrical protuberances 309 and 311, and wall 513 are such that biasing members 315 and 317 are advantageously flexed or bowed wherein free ends 323 and 325 of the biasing members are forced towards axis 4—4 (See FIG. 4 showing axis 4—4 with unflexed biasing members). The flexion in the biasing members provides a "pre-loading" or restoring force that biases engagement members 303 and 305 towards the aperture(s) in the associated appliance, keeping the housing (e.g., battery pack) coupled to the appliance (e.g., wireless terminal). The amount of pre-flexion or pre-loading provided to the biasing members is a function of several considerations, including: the amount of force required to satisfactorily secure the housing to the appliance, the amount of force desired to release the housing, and the elastic properties of the biasing members. Additional description pertaining to flexion in biasing members is provided below in conjunction with FIGS. 8a–8f.

Figure 8A:
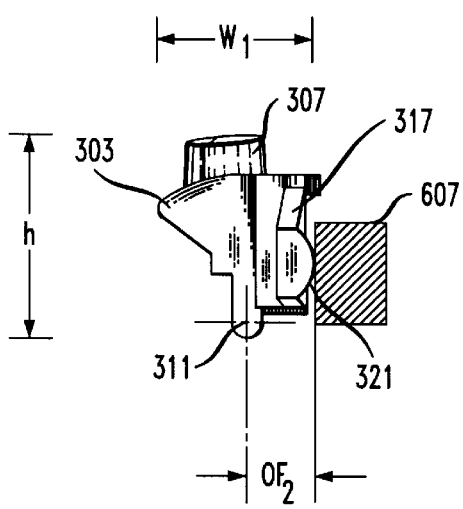
FIG. 8a depicts the fastener of FIG. 3 in a first position.
Figure 8B:
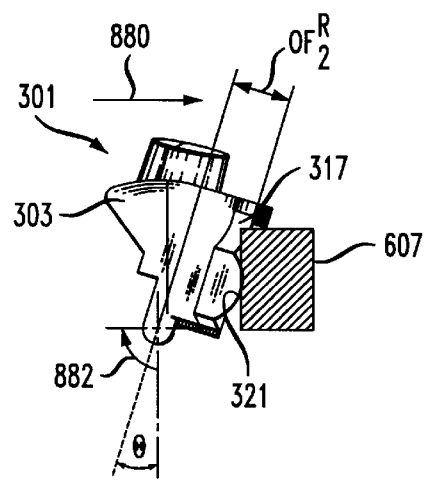
FIG. 8b depicts the fastener of FIG. 8a rotated away from the first position to a second position.

In operation, fastener 301 is disposed within housing 740 (FIG. 7) in a first position wherein engagement members 303 and 305 engage an appliance. (See FIG. 8a, appliance and housing not pictured for clarity.) To release housing 701 from the appliance, a user applies a force to knob 307 in a direction indicated by direction vector 880 (FIG. 8b). (See also FIG. 2, wherein a force is applied along direction vector 280 to disengage battery pack 240 from body portion of wireless terminal 250.) The applied force causes fastener 301 to rotate about axis 3—3 (FIG. 3) as indicated by direction vector 882 (FIG. 8b) to a second position wherein the engagement members disengage from the aperture(s) in the appliance.

As previously described, when fastener 301 is disposed within housing 740, the biasing members are flexed to provide a restoring force that keeps the engagement members engaged to the aperture(s) in the appliance. As fastener 301 rotates under applied force in the direction indicated by direction vector 882, fixed ends 324 and 326 of the biasing members are forced to the right (in FIG. 8b) of stress-reducing surfaces 319 and 321 depending from respective free ends 323 and 325 of the biasing members. Such motion further flexes the biasing members. As the applied force is withdrawn, energy stored within the flexed biasing members is released, causing fastener 301 to return to the first position.

In illustrative fastener 301, an offset $OF_1$ is advantageously provided between apex 320 of stress-reducing surfaces 319 and 321 and axis 4-4 running through semi-cylindrical protuberances 311, 313 (FIG. 4). As the biasing members are pre-loaded when the fastener is disposed within housing 701, offset $OF_1$ is somewhat decreased such that offset $OF_2$ results (FIG. 8a). The offset $OF_2$ advantageously decreases the amount by which biasing members 315 and 317 are flexed as fastener 301 rotates a given amount to the second position to disengage housing 701. Such decreased flexion results in decreased stress within the biasing members, and, therefore, a decreased likelihood of mechanical failure.

The aforementioned decrease in flexion is quantified below in Example 1 for the illustrative dimensions given therein. In Example 1, the performance of fastener 301 having an offset is compared to the performance of fastener 801 which does not have an offset but is otherwise identical to fastener 301. See FIGS. 8a–8d. It should be understood that the particular dimensions given below are provided as a basis for calculation. They are illustrative, and it will be recognized that different part sizes and dimensions will be adapted to a particular application based upon the teachings herein. Flexion in the biasing members is calculated using a processor running Pro/Engineer™ software available from Parametric Technology Corporation of Waltham, Mass.

EXAMPLE 1

Figure 8C:
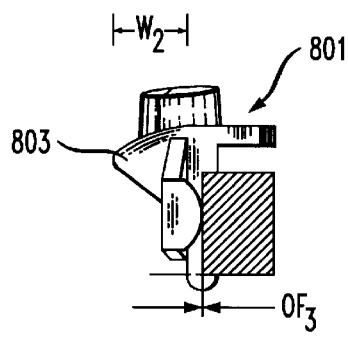
FIG. 8c depicts a second fastener in accordance an illustrative embodiment of the present invention in a first position.

FIGS. 8a and 8c depict side views of illustrative fasteners 301 and 801 in accordance with illustrative embodiments of the present invention. The length of both fasteners, as measured from a free end (e.g., 323) of one biasing member to a free end (e.g., 325) of the other biasing member, is 47 millimeters (mm). Height h of both fasteners, as measured, from the top of an actuating knob (e.g., 307) to the bottom of a semi-cylindrical protuberance (e.g., 309), is 10.4 mm.

Width $w_1$ of fastener 301, as measured from a tip of the engagement members 303, 305 to apex 320 of stress-reducing surfaces 319, 321 is 8.4 mm. Offset $OF_2$ is 3.55 mm. (Offset $OF_1$ is 3.9:5 mm; $OF_2$ is reduced by 0.4 mm to 3.55 mm as a result of pre-loading). Width $w_2$ of fastener 801, as measured from a tip of engagement member 803 to apex 820 of stress-reducing surface 821, is 4.85 mm. Pre-loading is maintained at 0.4 mm. There is no offset in fastener 801 (i.e., $OF_3$ is 0.0 mm).

Figure 8D:
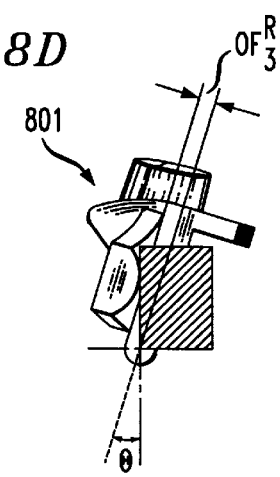
FIG. 8d depicts the fastener of FIG. 8c rotated away from the first position to a second position.

FIGS. 8b and 8d depict respective fasteners 301 and 801 rotated an amount Θ to the second position wherein the engagement members disengage from the aperture(s) of an appliance. For the present Example, Θ is equal to 16°. The offset $OF_2^R$ resulting when fastener 301 is rotated 16° is predicted to be 2.67 mm. Thus, biasing members 315, 317 of fastener 301 were deflected an additional 0.88 mm (3.55–2.67) as a result of the rotation. In contrast, the predicted offset $OF_3^R$ resulting from rotating fastener 801 by 16° is 1.03 mm. Thus, the biasing members of fastener 801 were deflected 1.03 mm due to rotation. Thus, compared to fastener 801 having no offset, offset $OF_2$ reduces deflection by about 15 percent for the assumed dimensions. It will be appreciated that the reduced deflection results in decreased stress in the biasing members.

Figure 8E:
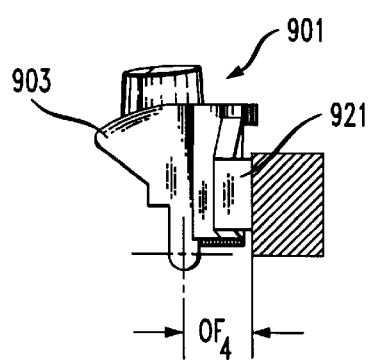
FIG. 8e depicts a third fastener in accordance an illustrative embodiment of the present invention in a first position.
Figure 8F:
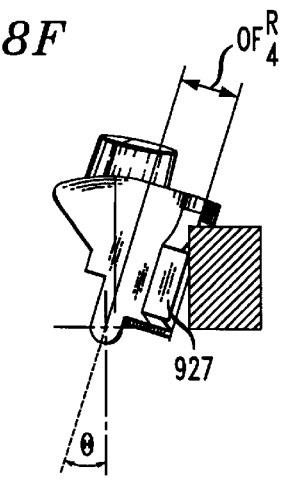
FIG. 8f depicts the fastener of FIG. 8f rotated away from the first position to a second position.

As already mentioned, stress reduction is also provided by stress-reducing surfaces 319 and 321 depending from free ends of respective biasing members 315 and 317. FIG. 8e depicts a side view of illustrative fastener 901 in accordance with an illustrative embodiment of the present invention. Although otherwise identical to fastener 301, in fastener 901, the stress-reducing surface 321 depending from the free end of each biasing member is replaced by flat surface 921. FIG. 8f shows fastener 901 rotated an amount Θ. Unlike curved stress-reducing surface 321 of biasing member 317 which slides, at substantially all points on its surface, against surface 611 of rib 607, flat surface 921 of fastener 901 tips at edge 927 to accommodate the rotation of the fastener. The benefit of using such curved surfaces is quantified below in Example 2 for the fastener dimensions assumed in that Example.

EXAMPLE 2

The dimensions of fastener 901 and fastener 301 are identical (e.g., $OF_2=OF_4$, etc.) and are given in Example 1, above. Offset $OF_4^R$ predicted for fastener 901 when rotated by 16° is 2.32 mm. Thus, the biasing members of fastener 901 were deflected 1.23 mm (3.55–2.32) due to rotation. Compared to fastener 901 having a flat surface disposed at the free end of each biasing member, the curved stress-reducing surfaces 319 and 321 reduce deflection in the biasing members by about 28 percent for the assumed dimensions.

Illustrative fastener 301 advantageously includes an additional adaptation for reducing stress in biasing members 315 and 317. In particular, a taper is advantageously provided to the biasing members wherein the height of biasing members 315 and 317 drops from a maximum at respective fixed ends 324 and 326 to a minimum at respective free ends 323 and 325. Such tapering distributes stresses in the biasing members in well known fashion.

In the illustrative embodiments shown and described herein, the biasing members are configured as cantilevers. The one free end of the cantilever reduces torsional stress that would be imparted if both ends of the biasing members were fixed.

The amount of force that a user is required to apply to knob 307 to rotate the fastener can be adjusted by changing the height at which the stress-reducing surfaces contact ribs 607 and 609. A lower point of contact (i.e., closer to inner surface 503 of base 502) reduces the amount of force required to rotate the fastener, and a higher point of contact (i.e., closer to knob 307) increases that amount.

In some embodiments, the present fastener is adapted to prevent debris, etc., from entering the housing through opening 613 in cover 602 of housing 740 (FIGS. 6 & 7) when the housing is attached to an appliance. For example, illustrative fastener 301 includes upper surface 331 (FIG. 3) which substantially seals any gap between knob 307 and the perimeter of opening that would be present when the housing is engaged to an appliance.

The housing 740 and appliance to which it mates advantageously include other features adapted to securely engage the housing to the appliance. Such other features may include, without limitation, tabs that are located at the other end of the housing from fastener 301 and which project therefrom to be received by recesses in the appliance. Moreover, an exterior surface of the appliance may be shaped to suitably receive and retain the appliance, in conjunction with use of the fastener.

Figure 9:
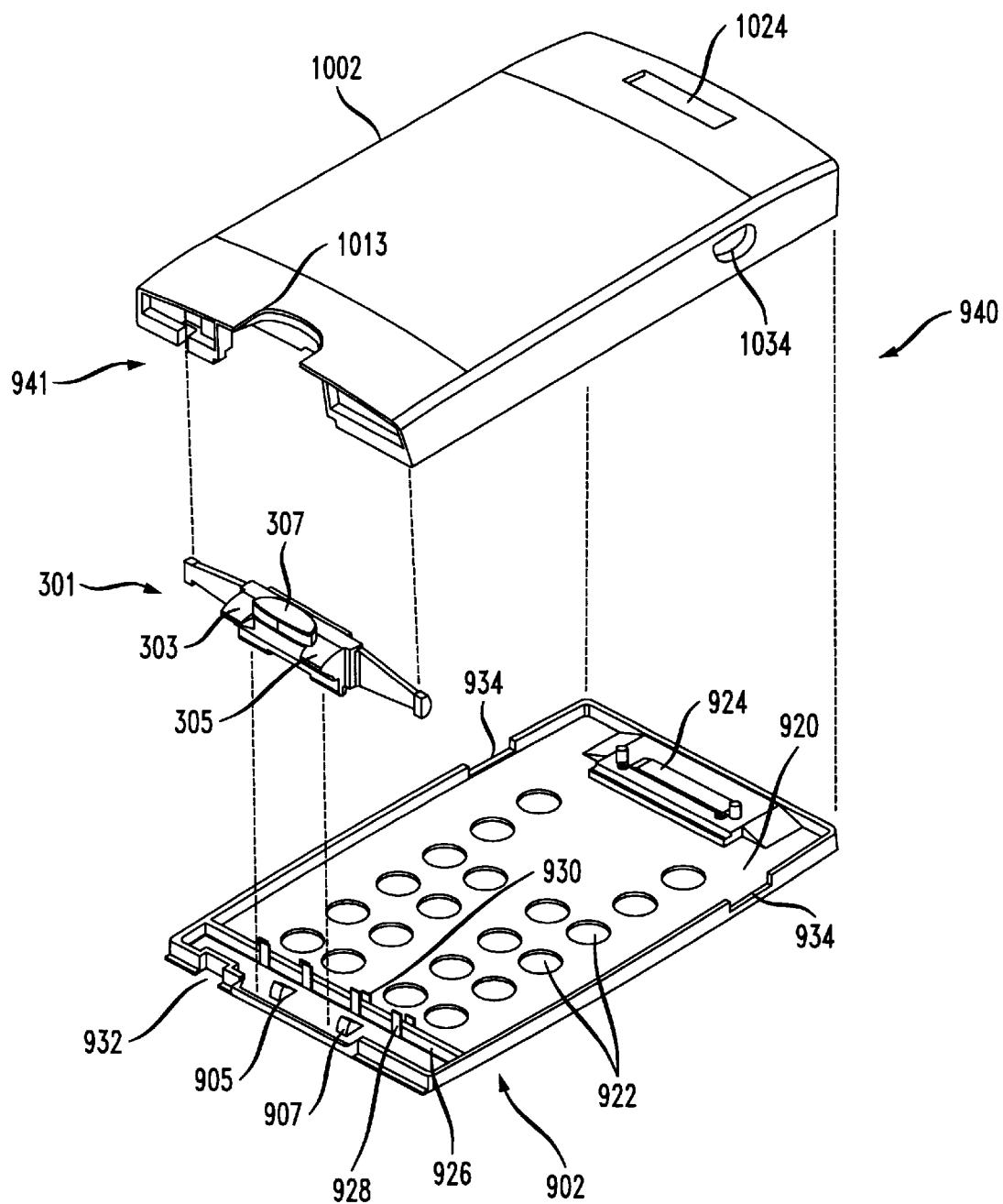
FIGS. 9 and 10 depict exploded views of an embodiment of a battery pack for use in conjunction with a wireless terminal in accordance with an embodiment of the present invention.
Figure 10:
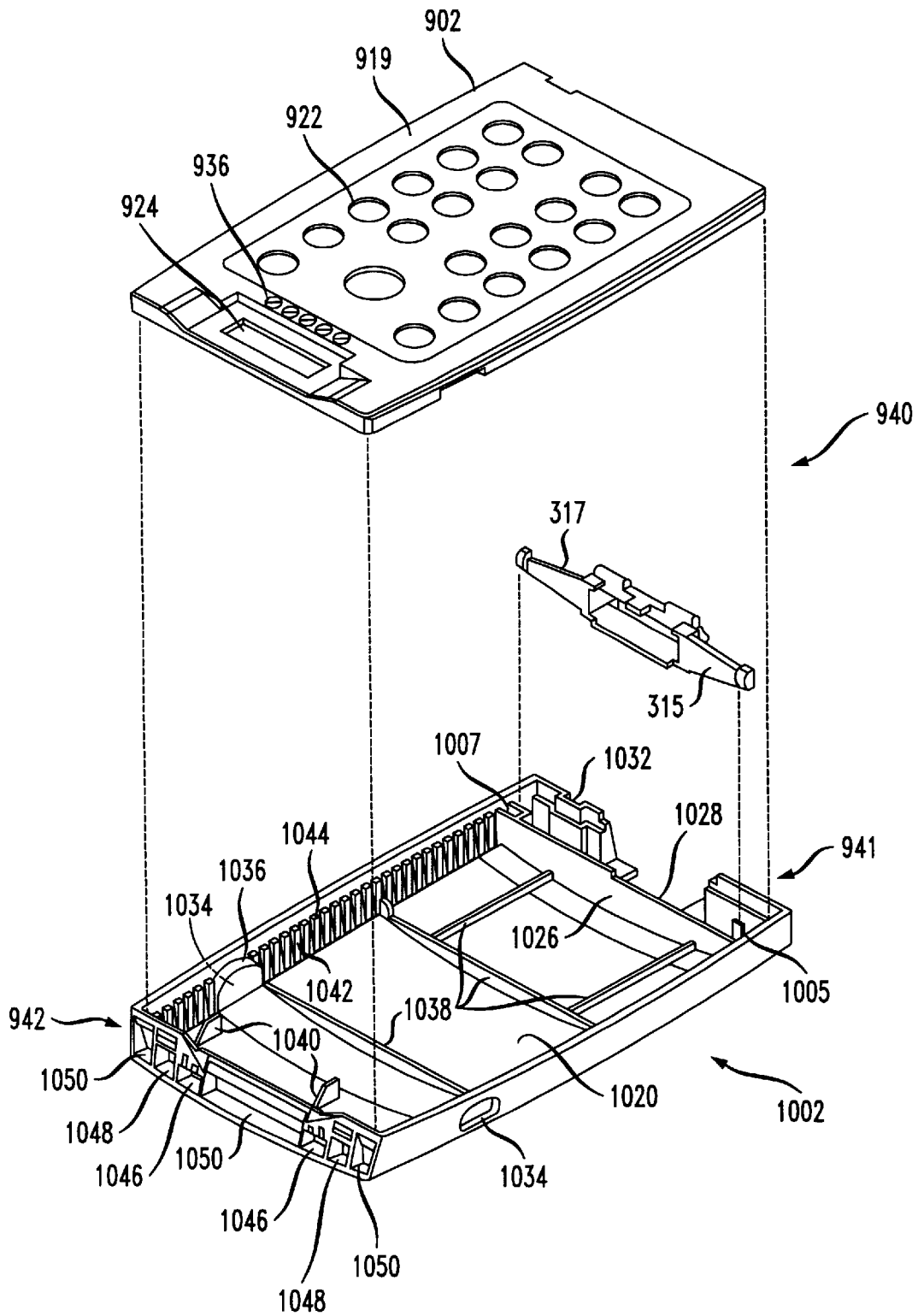

FIGS. 9 & 10 depict exploded views of an embodiment of a battery pack 940 for use in conjunction with a wireless terminal in accordance with an illustrative embodiment of the present invention. Battery pack 940 includes a base 902, cover 1002 and fastener 301, previously described. FIG. 9 provides a view of inside surface 920 of base 902, and FIG. 10 provides a view of inside surface 1020 of cover 1002. The base and cover are molded from suitable plastics, such as, for example, polycarbonate (PC), acrylonitrile-butadiene-styrene copolymer (ABS) and alloys of PC and ABS. One or more batteries are contained within battery pack 940. Such batteries are not pictured for clarity of illustration. Batteries typically used for powering wireless terminals include, without limitation, nickel cadmium, nickel hydride and lithium.

Base 902 and cover 1002 incorporate structural adaptations, such as wedge-shaped stops 905 and 907, oblong opening 1013 for receiving knob 307 of fastener 301, and ribs 1005 and 1007 for receiving respective biasing members 315 and 317, that advantageously cooperate with fastener 301 in the manner previously described. Moreover, base 902 and cover 1002 advantageously include additional features that provide a variety of functional and/or aesthetic benefits to battery pack 940. Such features are described below.

Base 902 includes a plurality of holes 922. Such holes provide weight reduction. In use, base 902 of battery pack 940 abuts a body portion of the wireless terminal, such that the holes are not exposed to the outside environment wherein foreign matter could enter the battery pack. Furthermore, tape or other material can be placed over such holes. Opening 922 in base 902 facilitates a first electrical connection between the wireless terminal (not shown) and the battery pack. The first electrical connection can be used for delivering charge from battery pack 940 to the wireless terminal, and, alternatively, for charging the batteries via the wireless terminal. An opening 1022 in cover 1002 facilitates a second electrical connection between the battery pack and a battery charger. A cross member 926 disposed on inside surface 902 provides support for a plurality of bonding ribs 928. A top surface 930 of each bonding rib 928 provides a surface for bonding to interior features of cover 902, such as upper surface 1028 of cross member 1026. Such surfaces can be suitably bonded using, for example, ultrasonic bonding.

Keying recess 932 in base 902 and keying recess 1032 in cover 1002 each receive a projection (not shown) from the wireless terminal to substantially pre-vent any lateral motion of battery pack 940 once it is engaged to the body portion of the wireless terminal. Car-catch recesses 1034 in cover 1002 receive engagement members (not shown) from a mount disposed in an automobile. Such recesses and engagement members facilitate secure mounting of the wireless terminal to the mount within the automobile. Openings 934 in the sidewalls of base 902 provide clearance for enclosure 1036 defining the car-catch recesses. Since inside surface 1020 of cover 1002 is curved, ridges 1038 are advantageously disposed on the inside surface to provide a level flat receiving surface for the batteries. Guides 1040 restrict battery movement within the battery pack.

Top 1044 of each of a plurality of ribs 1042 disposed on the sidewalls of inner surface 1020 of cover 1002 provide a surface for bonding cover 1002 to base 902. Engagement recesses 1046 receive engagement members (not shown) from the body of the wireless terminal to secure end 942 of battery pack 904 to the wireless terminal. End 941 of the battery pack is secured to the body of the wireless terminal via engagement members 303 and 305 of fastener 301. Contact-receiving recesses 1048 receive contacts from the wireless terminal providing a third electrical connection for battery charging. Cavities 1050 provide weight reduction.

Labels 936 on outer surface 919 of base 902 advantageously provide information about battery type (e.g., NiCad, etc.) and further provide the identity of various terminals (e.g., positive, negative, battery temperature, etc.) accessible through opening 924. Such labels provide guidance to an individual wishing to establish electrical contact between the contacts and a probe to obtain information about the state of the batteries.

It is to be understood that the above-described embodiments are merely illustrative of the invention and that many variations may be devised by those skilled in the art without departing from the scope and spirit of the present invention. For example, while stress-reducing surfaces 319, 321 were depicted as having a substantially circular profile, other pro files may suitably be used. Moreover, while illustrative fastener 301 includes two biasing members, in other embodiments, one such biasing member could be used with appropriate modifications. Furthermore, it should be clear that while in some embodiments, the fastener may include all the stress-reducing features described herein, in other embodiments, only one or some but not all of such stress-reducing features may be included. It is therefore intended that the aforementioned variations and a full range of equivalents consistent with the present inventive contribution be included within the scope of the following claims.

We claim:

1. A package, comprising:

a body portion;

a housing coupled to the body portion, the housing including a fastener that engages the body portion and is operable to couple the housing to the body portion, the fastener comprising:

an engagement member for providing a mechanical connection to the body portion; the fastener being rotatably mounted in the housing, such that the fastener is rotatable about an axis of rotation between a first position in which the engagement member engages the body portion, and a second position in which the engagement member is disengaged from the body portion;

a trigger for causing the fastener to rotate from the first position to the second position, thereby causing the engagement member to disengage from the body portion; and a flexed biasing member operable, in the absence of an applied releasing force, to keep the fastener in the first position, in which the engagement member is engaged to the body portion, the biasing member including a stress-reducing surface abutting an inner surface of the housing, the stress-reducing surface operable to decrease stress in the biasing member as the fastener is rotated about the axis for disengagement from the body portion.

2. The package of claim 1, wherein the stress-reducing surface is offset from the axis of rotation.

3. The package of claim 1, wherein the stress-reducing surface is curved.

4. The package of claim 1, wherein the biasing member is physically configured to reduce stress resulting from torsional forces.

5. The package of claim 4, wherein the biasing member is configured as a cantilever.

6. The package of claim 5, wherein the stress-reducing surface depends from a free end of the biasing member.

7. The package of claim 1, wherein the fastener comprises two biasing members.

8. The package of claim 1, wherein the package is an appliance.

9. The package of claim 8, wherein the appliance is a wireless terminal.

10. The package of claim 8, wherein the housing comprises a battery pack.

11. A housing configured for attachment to a device, the housing comprising:

a portion that is physically adapted to receive a fastener operable to couple the housing to the device, the fastener comprising:

an engagement member for providing a mechanical connection to the device, the fastener being rotatably mounted in the housing, such that the fastener is rotatable about an axis of rotation between a first position in which the engagement member engages the device, and a second position in which the engagement member is disengaged from the device;

a trigger for causing the fastener to rotate from the first position to the second position, thereby causing the engagement member to disengage from the device; and a flexed biasing member operable, in the absence of an applied releasing force, to keep the fastener in the first position, in which the engagement member is engaged to the device, the biasing member including a stress-reducing surface abutting an inner surface of the housing, the stress-reducing surface operable to decrease stress in the biasing member as the fastener is rotated about the axis for disengagement from the device.

12. The housing of claim 11, wherein the stress-reducing surface is offset from the axis of rotation.

13. The housing of claim 11, wherein the stress-reducing surface is curved.

14. The housing of claim 11, wherein the biasing member is physically configured to reduce stress resulting from torsional forces.

15. The housing of claim 14, wherein the biasing member is configured as a cantilever.

16. The housing of claim 15, wherein the stress-reducing surface depends from a free end of the biasing member.

17. The housing of claim 11, wherein the fastener comprises two biasing members.

18. The housing of claim 11, wherein an electrical component is contained therein.

19. The housing of claim 18, wherein the electrical component is a battery.

20. The housing of claim 11, wherein the physically adapted portion of the housing comprises a stop disposed on a first interior surface of the portion for defining the axis of rotation of the fastener, and a rib disposed on a second interior surface of the portion for receiving the stress-reducing surface of the flexed biasing member.

21. The housing of claim 11, further comprising an opening through which the engagement member extends to engage the device.

22. The housing of claim 21, wherein the trigger extends through the opening.

23. A one piece fastener, comprising:

an engagement member that allows the fastener, when received by a suitably-configured housing, to engage the housing to a device, the fastener being rotatably mounted in the housing, such that the fastener is rotatable about an axis of rotation between a first position in which the engagement member engages the device, and a second position in which the engagement member is disengaged from the device;

a trigger for causing the fastener to rotate from the first position to the second position; and a flexible biasing member that, when the fastener is mounted into a housing, is flexed and is operable, in the absence of an applied releasing force, to provide a force that keeps the fastener in the first position, in which the engagement member is engaged to the device, the biasing member including a stress-reducing surface abutting an inner surface of the housing, the stress-reducing surface operable to decrease stress that accumulates in the biasing member as the fastener is rotated about the axis to disengage the fastener from the device wherein, the stress-reducing surface is offset from an axis of rotation of the fastener.

24. The fastener of claim 23, wherein the flexible biasing member is a cantilever.

25. The fastener of claim 23, wherein the stress-reducing surface is curved.

26. The fastener of claim 24, wherein the stress-reducing surface depends from a free end of the biasing member.

* * * * *